United States Patent [19]

Phillips

[11] Patent Number: 5,120,183

[45] Date of Patent: Jun. 9, 1992

[54] LOAD TRANSPORTING DOLLY

[76] Inventor: Mark D. Phillips, 20022 Appledower Cir. #11, Germantown, Md. 20874

[21] Appl. No.: 668,218

[22] Filed: Mar. 12, 1991

[51] Int. Cl.$^5$ ............................................... B62B 1/04
[52] U.S. Cl. ................................ 414/490; 280/47.28; 414/451; 414/621
[58] Field of Search ............... 414/450, 451, 452, 453, 414/454, 455, 456, 477, 490, 549, 550, 555, 444, 445, 446, 447, 448, 449, 457, 621, 622; 280/47.24, 47.28; 294/67.22, 67.32

[56] References Cited

U.S. PATENT DOCUMENTS

| | | | |
|---|---|---|---|
| 401,506 | 4/1889 | MacPherson | 414/452 |
| 1,000,102 | 8/1911 | McCoy | 414/450 |
| 2,475,874 | 7/1949 | Bartlett | 414/452 |
| 2,560,438 | 7/1951 | Gunn, Jr. | 414/621 |
| 2,584,870 | 2/1952 | Hally | 414/621 X |
| 2,651,427 | 9/1953 | Butler | 414/450 |
| 2,678,744 | 5/1954 | Kruse | 414/621 |
| 3,045,851 | 7/1962 | Rupert | 414/451 X |
| 3,278,061 | 10/1966 | Christensen | 414/456 |
| 4,244,595 | 1/1981 | Sagert | 414/490 X |
| 4,281,957 | 8/1981 | Vishe et al. | 414/490 X |
| 4,793,623 | 12/1988 | Talbot | 414/490 X |
| 4,865,339 | 9/1989 | Rundborg et al. | 414/490 X |

FOREIGN PATENT DOCUMENTS 0638432 2/1928 France ................. 414/457

Primary Examiner—Robert J. Spar
Assistant Examiner—James Keenan
Attorney, Agent, or Firm—Epstein, Edell & Retzer

[57] ABSTRACT

A load transporting dolly includes a frame having a flange on a lower end thereof to be positioned above an upstanding wall of a tray containing a load and a foot positioned in spaced relation with the flange for engaging the load when the flange is placed above the side wall. Spaced, parallel legs joined to opposing lateral ends of the flange extend upwardly therefrom, and arms for positioning and holding the load upon the frame are mounted, respectively, on the legs for selective rotation around a first axis and selective sliding movement along the first axis to extend along lateral sides of the load perpendicular with the foot. The arms are rotatable around a second axis perpendicular with the first axis and are slidable along the second axis to selectively position gripping fingers in the arms and planes containing the arms to permit the gripping fingers to be placed in a clearance adjacent lateral sides of the load and positioned to extend along a back of the load. Wheels mounted on the frame support the frame on the ground or floor, and a handle on an upper end of the frame allows the frame to be rotated around the wheels to lift the load from the tray and support the load against the frame while the arms position and stabilize the load. A frame support is rotatably mounted on the frame for selectively supporting the frame and, therefore, the load in a selective angular position with the ground or floor.

20 Claims, 2 Drawing Sheets

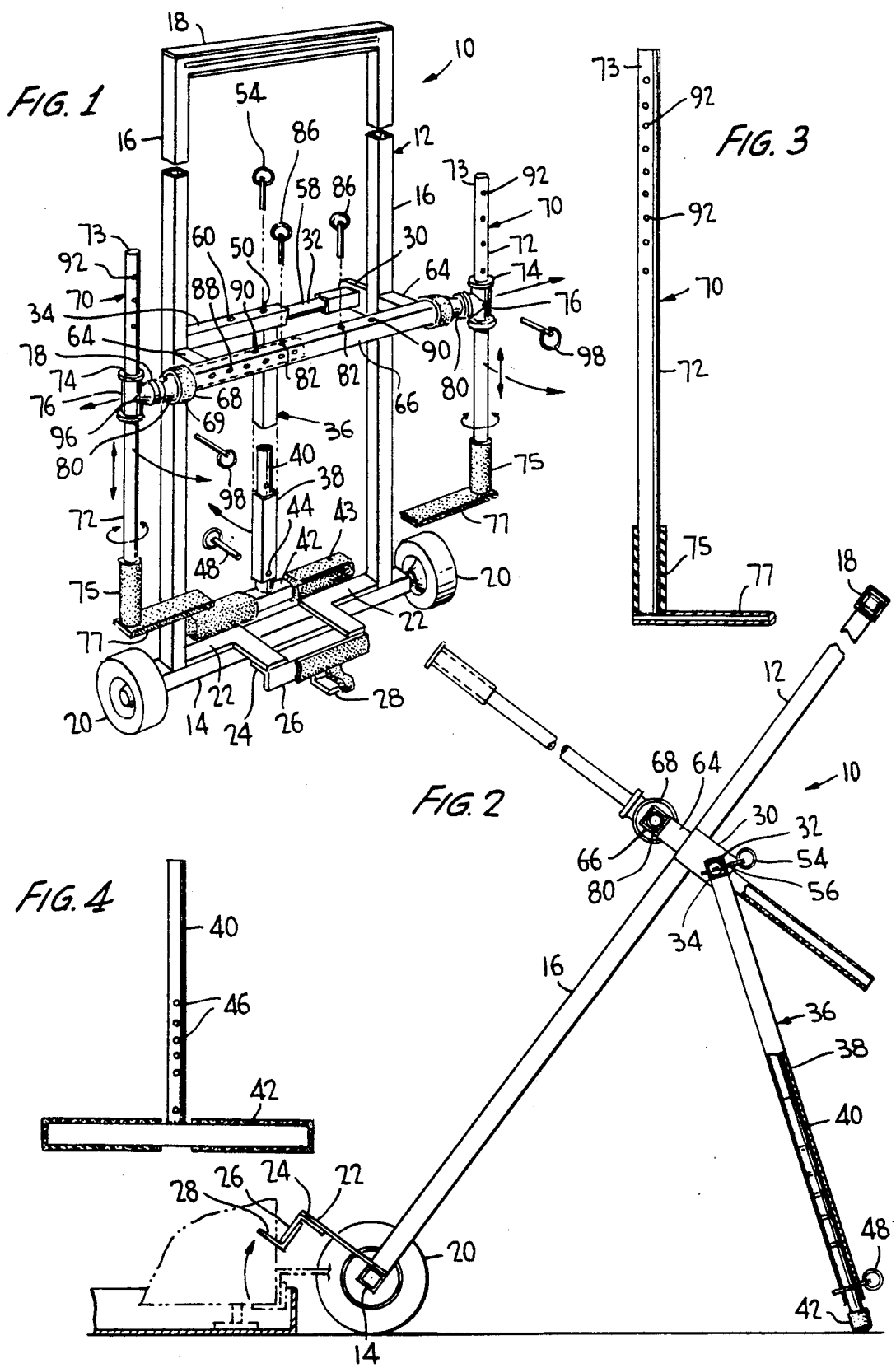

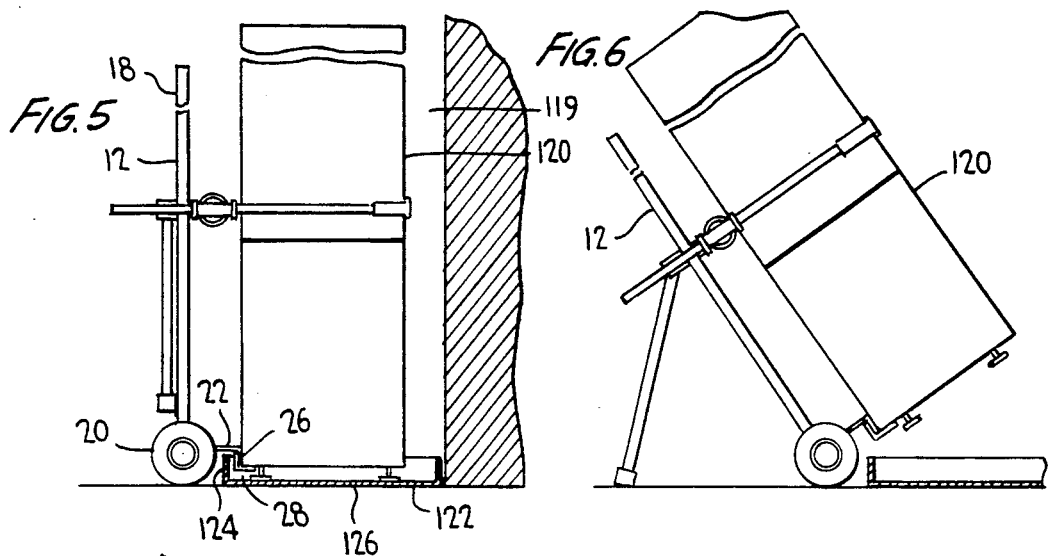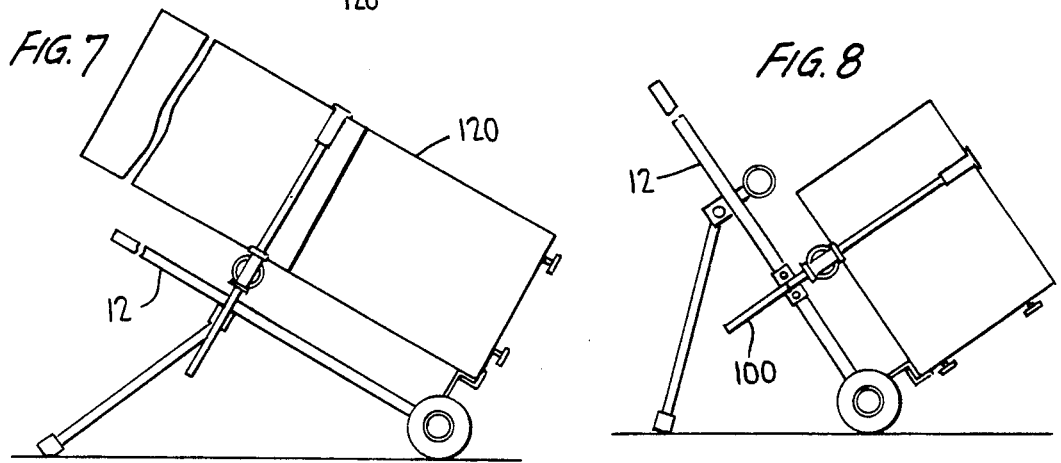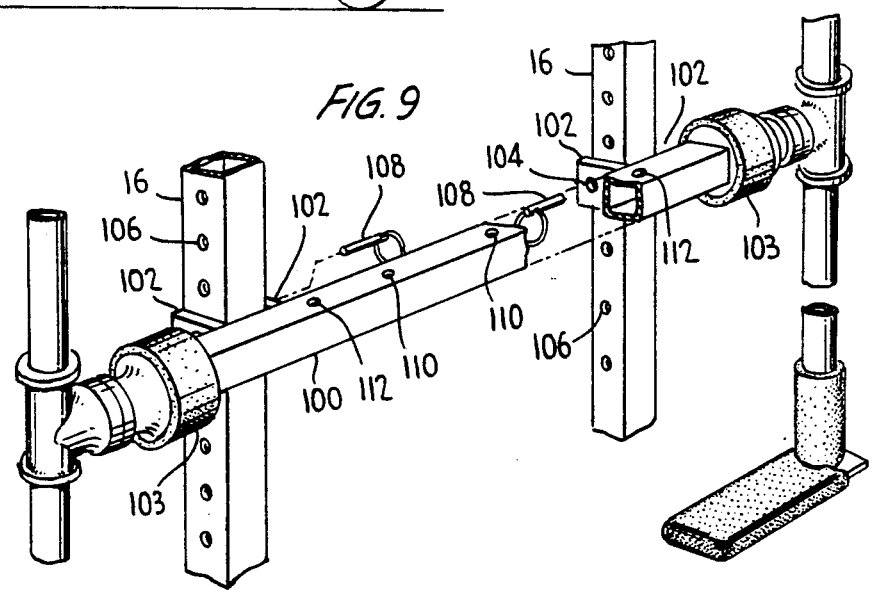

LOAD TRANSPORTING DOLLY

BACKGROUND OF THE INVENTION

1. Field Of The Invention

The invention pertains to load transporting vehicles and, more particularly, to a dolly for transporting loads in closely confined areas.

2. Description Of The Prior Art Wheeled vehicles, or dollies, for transporting loads generally include an upright frame having wheels thereon, and a base carried on the frame for receiving a load to be supported on the base and against the frame when the frame is manually pivoted or tilted by an operator via grasping handles on the frame and pushed along the ground via the wheels. Most dollies are utilized by positioning the base beneath a load and pivoting the frame around the wheels to tilt the base and, therefore, the load, to support the load against the frame. Because the base is commonly cantilevered from the frame in spaced relation with the ground, the base must be very large to sustain the weight of heavy loads placed thereon. Even when the base is supported on the ground, the base must still be very large when transporting relatively heavy loads to allow the base to tilt with the frame without structural damage and detachment of the base from the frame. Additionally, it is frequently difficult to position the base beneath a load, particularly when the base is large and/or elevated above the ground, and the load must be lifted manually and placed upon the base, or tilted to permit the base to be placed under the load. When the load is very heavy, lifting of the load can cause physical injury to the operator, may necessitate extraneous lifting equipment and detracts substantially from the functional utility of the dolly.

A further disadvantage of conventional dollies when transporting heavy loads is that it is extremely difficult to stabilize such loads as part of the weight of the load is transferred to the frame when the dolly is tilted from the upright position to an inclined position by handles on the frame. The dollies commonly over-rotate during tilting, and an operator can easily lose his grasp on the handles resulting in the dolly and the load falling to the ground. Therefore, it is typically necessary for an assistant to hold and stabilize the load while an operator rotates the dolly, and both the operator and the assistant are at risk of physical injury should the load become unstable. Once the dolly has been rotated and the load is supported on the frame in an inclined position, it may be desirable to maintain the load in such position for improved access to certain parts of the load. Requiring a operator to hold the dolly at length in a tilted position is at best inefficient and tedious, diverting the operator from other tasks, and may be physically impossible for heavy loads. However, most dollies fail to permit the frame to be supported in a selective inclined position without reliance on an operator to hold the frame.

Another drawback to presently available dollies is that such dollies are usually unsuitable for transporting relatively large loads. Large loads generally require a large base to stabilize the loads; however, even when the base is big, large loads tend to destabilize when the dolly is rotated. The rotational force applied by an operator to rotate the dolly must be equal across a large load, otherwise the load can tip laterally and fall off the dolly, potentially injuring an operator and/or damaging the load. It is difficult for an operator to precisely control the rotational force applied via the handles, and frequently one side of the load receives more rotational force than the other side of the load causing the load to topple. An assistant is usually necessary when transporting large loads to manually maintain proper positioning of the load upon the base when the dolly is rotated by an operator, and positioning forces applied to the load by an assistant can produce additional instability when the load is tilted on a dolly.

The deficiencies associated with presently available dollies are even further pronounced when transporting loads in closely confined areas. Frequently, loads to be transported are situated such that multiple sides, or faces, of the load are enclosed by walls of a room, a storage cubicle, a closet and the like prohibiting access to all but one side or face of the load. When transporting such loads with conventional dollies, it is extremely difficult to position the loads upon the base of the dolly and to stabilize the loads during rotation of the dolly because the inaccessible sides of the load cannot be grasped by an assistant to lift the load for placement on the base and to control the load during rotation. If the walls are very close to the load, efforts by one or more assistants to move the load onto a dolly and to position the load thereon can result in crushing of the assistants' hands and fingers between the load and the walls. It is usually necessary, therefore, that such loads be removed from the confined areas prior to transport on a dolly and, when the loads are relatively heavy and/or large, movement of the loads can require intensive labor and specialized lifting equipment, result in physical injury to the movers as well as damage to the load, and generally detracts from the efficacy of the dolly.

Illustrative of loads in closely confined areas are certain washer and dryer units and, in particular, washer and dryer units disposed in a vertically stacked arrangement in a closet having walls closely surrounding the washer/dryer unit. Such washer/dryer units have become popular for use in apartments, townhouses and other buildings where space is a premium because the stacked units can be accommodated in a relatively narrow width closet. The units are typically required by building codes to be positioned in a drip pan on the bottom or floor of the closet, and the drip pans typically include an upstanding peripheral side wall three to four inches high within which the washer/dryer unit is positioned. Plumbing connections to the washer/dryer units are made through the closet floor via the bottom of the drip pans and only the front face of the washer/dryer units can be readily accessed by opening a door on the closet. When the washer/dryer units require repair or maintenance, service personnel must obtain access to the back and/or the bottom face of the stacked units and this is an extremely cumbersome and difficult procedure. The accepted practice is to manually lift the washer/dryer units above the side wall of the drip pan and remove the units from the closet. Although the actual repair work usually requires only a single service man, additional service personnel must be sent to the job site to perform this lifting. Lifting the washer/dryer units is a precarious and dangerous task due to the units being very heavy and tall, and job related injuries are very common. Moreover, the walls of the closet are usually spaced only slightly from the side faces of the washer/dryer units, and the fingers and hands of service personnel are frequently caught and/or crushed between the washer/dryer unit and the closet walls. Additionally, the side wall of the drip pans and plumbing connections are commonly damaged when lifting and moving stacked washer/dryer units, and damage to the closet and adjacent walls and objects is also a frequent occurrence. Once stacked washer/dryer units have been removed from a closet, the units must then be positioned to allow service personnel to perform the necessary repair and/or maintenance. Positioning the units is also extremely difficult because the units may have to be tilted or laid on the floor to gain access to certain components. Upon completion of the repair and/or maintenance, the washer/dryer units must be restored to an upright position and returned to the closet, and the aforementioned difficulties are repeated. Presently available dollies are unsuitable for transporting stacked washer/dryer units in a closet because the upstanding side wall on the drip pans prevents the base on the dollies from being positioned beneath the washer/dryer units. Moreover, the walls of the closet being very close to the side faces of the washer/dryer units prevents service personnel from lifting the units onto a dolly and from stabilizing the units when rotated on a dolly. Conventional dollies also lack supports for supporting stacked washer/dryer units in a selected inclined position to permit repair and/or maintenance thereon once the units have been removed from a closet.

SUMMARY OF THE INVENTION

Accordingly, it is an object of the present invention to overcome the aforementioned disadvantages of prior art dollies and load transporting vehicles.

Another object of the invention is to transport loads in closely confined areas.

It is also an object of the invention to transport a conventional stacked washer/dryer unit positioned in a closet.

A further object of the invention is to stabilize loads when rotated to an inclined position on a dolly.

Moreover, it is an object of the invention to selectively support a load in an inclined position on a dolly.

A still further object of the invention is to provide a dolly having a relatively small base for supporting relatively heavy loads thereon.

In addition to the foregoing objects, the invention possesses the advantages of being structurally uncomplicated, simple to operate, and cost effective, of permitting a single service man to remove a stacked washer/dryer from a closet and position such unit for repair and/or maintenance without risk of physical injury, of eliminating damage to drip pans, plumbing, walls and surrounding objects when removing stacked washer/dryer units from closets, and of protecting the hands and fingers of service personnel when transporting stacked washer/dryer units in a closet.

Accordingly, the present invention is characterized by a frame including a horizontally oriented load carrying foot supported on the ground or floor by a pair of wheels, a pair of parallel legs perpendicularly joined, respectively, opposing lateral ends of the foot to extend upwardly therefrom, and a handle joining the upper ends of the legs to permit the frame to be selectively rotated via the handle around the wheels between an upright position wherein the legs are disposed generally perpendicular with the ground, and an inclined position wherein the legs are disposed angularly with the ground and wherein a load carried on the foot is supported against the frame. The foot is joined to a flange that projects forwardly from the base, such that the foot can be positioned within a pan or tray to engage a load therein when the flange is positioned above an upstanding side wall of such tray. A pair of load positioning arms are mounted, respectively, on the legs for rotation around a first axis and for lateral sliding movement along this first axis to independently, selectively position the arms forwardly of the frame generally perpendicular with the foot to extend closely along opposing lateral sides of a load engaged by the foot. Load gripping fingers are perpendicularly joined to ends of the arms, and the arms are mounted for rotation around a second axis perpendicular with the first axis to selectively position the load gripping fingers in planes containing the arms to permit the load gripping fingers to be positioned in a clearance between the lateral sides of the load and walls confining such sides. The arms are mounted for selective sliding movement relative to the frame along the second axis to position the load gripping fingers a selective distance from the frame to extend along a back of the load and position and hold the load upon the frame. The frame is rotatable around the wheels via the handle to the inclined position, and a frame support is rotatably mounted on the frame to be selectively positioned rearwardly of the frame to support the frame and, therefore, the load, in a selective angular position with the ground or floor.

Other objects and advantages of the present invention will become apparent from the following description of the preferred embodiment taken in conjunction with the accompanying drawings wherein like parts in each of the several figures are identified by the same reference characters.

BRIEF DESCRIPTION OF THE DRAWINGS

FIG. 1 is a perspective view of the load transporting dolly according to the present invention.

FIG. 2 is a side view, partly in section, of the load transporting dolly of FIG. 1 supported in an inclined position by a frame support.

FIG. 3 is a front view, partly in section, of a positioning arm of the load transporting dolly of FIG. 1.

FIG. 4 is a front view, partly in section, of the frame support of the load transporting dolly of FIG. 1.

FIG. 5 is a side view of the load transporting dolly of FIG. 1 supporting a stacked washer/dryer unit in an upright position in a drip pan.

FIG. 6 is a side view of the load transporting dolly of FIG. 1 supporting a stacked washer/dryer unit in a first inclined position.

FIG. 7 is a side view of the load transporting dolly of FIG. 1 supporting a stacked washer/dryer unit in a second inclined position.

FIG. 8 is a side view of a second alternative embodiment for the load transporting dolly of FIG. 1 supporting a load in an inclined position.

FIG. 9 is a broken, perspective view of the load transporting dolly of FIG. 8.

DESCRIPTION OF THE PREFERRED EMBODIMENTS

As shown in FIGS. 1-4, the dolly 10 of the present invention includes a generally rectangular frame 12 having a horizontally oriented base 14 of generally uniform width and thickness, a pair of upstanding, vertically oriented legs 16 of generally uniform width and thickness extending perpendicularly upwardly from opposing lateral ends of the base 14 in spaced parallel relation and a padded handle 18 of generally uniform width and thickness transversely joining upper ends of the legs 16 disposed parallel to the base 14. Wheels 20 are mounted on opposing lateral ends of the base 14 laterally outwardly of the legs 16 to support the base 14 in spaced relation above the ground or floor, to permit movement of the frame 12 along the ground or floor when pushed or pulled via the handle 18 and to permit pivoting or rotation of the frame 12 around the wheels 20 via the handle 18 from an upright position, as shown in FIG. 1, wherein the legs are generally perpendicular with the ground or floor and an inclined position, as shown in FIG. 2, wherein the legs are disposed at an acute angle with the ground or floor. A pair of angular flanges 22 are joined to the lower ends of the legs 16 to extend over the base 14, and the flanges 22 extend inwardly from the legs 16 toward the center of the base 14 and extend angularly forwardly of the base 14. An angular web 24 of generally uniform width and thickness joins the forwardmost ends of the flanges 22, and the web 24 is positioned forwardly of the base 14 in spaced parallel relation therewith and is elevated above the ground or floor when the frame 12 is supported thereon in an upright position by the wheels 20. The web 24 includes a positioning shoulder 26 depending perpendicularly from the forwardmost edges of the flanges 22, and a load engaging foot 28 extends perpendicularly forwardly from the shoulder 26 a short distance to be positioned perpendicular with the legs 16 in spaced parallel relation with the base 14 and with the ground or floor when the frame 12 is in an upright position upon the wheels 20.

Plates 30 are secured on the legs 16 centrally along the longitudinal length thereof between the base 14 and the handle 18 in horizontal alignment, and the plates 30 extend perpendicularly a short distance rearwardly of the legs 16. A pivot shaft 32 is rigidly secured to the plates 30 to extend transversely therebetween parallel with the base 14 and the handle 18. A hollow, rearward crossbar 34 is mounted concentrically over the pivot shaft 32 for rotation relative to the shaft 32 and, therefore, the frame 12. As shown in FIGS. 1 and 4, a T-shaped frame support 36 is attached to the rearward crossbar 34 and includes a hollow vertical member 38 having an upper end perpendicularly joined to the rearward crossbar 34 centrally between the plates 30, a tubular member 40 slidably disposed in an open lower end of the vertical member 38 and a horizontal member 42 joined perpendicularly at the center thereof to a lower end of the tubular member 40 that projects slightly from the open lower end of the vertical member 38 for positioning on the ground or floor to support the frame 12 in an inclined position thereon. As shown in FIG. 2, padding 43 covers the horizontal member 42 to protect the ground or floor when the horizontal member 42 is resting thereon. A hole 44 is formed in the lower end of the vertical member 38, and a plurality of linearly aligned holes 46 are formed in the tubular member 40 at longitudinally spaced locations therealong to be selectively aligned with the hole 44 when the tubular member 40 is slid within the vertical member 38 to selectively increase and decrease the distance of the horizontal member 42 from the rearward crossbar 34 and thereby adjust the length of the frame support 36 and, therefore, the angle of inclination for the frame 12 relative to the floor. A locking pin 48 is insertable through the vertical member 38 into the aligned holes 44 and 46 to lock the horizontal member 42 relative to the vertical member 38. A hole 50 is formed in the center of the rearward crossbar 34 generally aligned with the vertical member 38, and a hole is formed in the pivot shaft 32 to be aligned with the hole 50 when the frame support 36 is in an inoperative position, wherein the frame support 36 is generally disposed in a plane parallel with a plane containing the legs 16 as shown in FIG. 1. A locking pin 54 is insertable into the aligned holes to lock the frame support 36 in the inoperative position, and is selectively removable from the aligned holes to permit the frame support 36 to be rotated rearwardly of the frame 12 around the pivot shaft 32. A first aperture 56 is formed in the rearward crossbar 34 laterally offset from the hole 50, and a first aperture 58 is formed in the pivot shaft 32 angularly offset from the hole therein to be aligned with the first aperture 56 when the frame support 36 is rotated rearwardly of the frame 12 around the pivot shaft 32 to a first operative position, as shown in FIG. 2, wherein the frame support 36 is disposed at a first acute angle with the lower end of the frame 12 and the frame is supported at an acute angle with the ground or floor. The locking pin 54 is insertable through the aligned first apertures 56 and 58 to lock the frame support 36 in the first operative position and to permit the horizontal member 42 to be placed on the ground or floor to support the frame 12 angularly with the ground or floor. A second aperture 60 is formed in the rearward crossbar 34 spaced from and horizontally aligned with the first aperture, and a second aperture (not shown) is formed in the pivot shaft 32 angularly offset from the first aperture 58 to be aligned with the second aperture 60 when the frame support 36 is rotated rearwardly of the frame 12 around the pivot shaft 32 to a second operative position, wherein the frame support 36 is disposed at a second acute angle with the lower end of the frame 12 greater than the first acute angle and the frame 12 is supported closer to the ground or floor than in the first operative position. The locking pin 54 is insertable into the aligned second apertures to lock the frame support 36 in the second operative position and to permit the horizontal member 42 to be placed on the ground or floor to support the frame 12 angularly with the ground or floor.

Spacers 64 are attached to the forward facing surface of the legs 16 to extend perpendicularly forwardly therefrom in general horizontal alignment with the rearward crossbar 34, and a hollow forward crossbar 66 is joined to forward ends of the spacers 64 to be disposed forwardly of the legs 16 in spaced parallel relation with the rearward crossbar 34. Opposing open ends of the forward crossbar 66 extend laterally beyond the legs 16, and bushings 68 having external protective coverings 69 are mounted on the opposing open ends of the forward crossbar 66. As shown in FIGS. 1 and 3, load positioning arms 70 to be mounted on the forward crossbar 66 include straight, elongated bars 72 having first ends 73 slidably and rotatably received in open-ended sockets 74 in T-shaped fittings 76, and flattened, externally padded gripping fingers 77 are joined perpendicularly to opposite, externally padded second ends 75 of the bars 72. Closed-end sockets 78 are formed in the fittings 76 perpendicular to the open-ended sockets 74, and pivot shafts 80 have ends rigidly secured coaxially in the closed-end sockets 78. Opposite, unsecured ends of the pivot shafts 80 are passed through the bushings 68 to be slidably and rotatably disposed in the opposing open ends of the forward crossbar 66. Openings 82 are formed in the forward crossbar 66 to be aligned with openings (not shown) formed in the ends of the pivot shafts 80 within the forward crossbar 66 when the arms 70 are disposed in an inoperative position, wherein the bars 72 are disposed generally parallel to the legs 16 and the fittings 76 are adjacent the bushings 68 as shown in FIG. 1. Locking pins 86 are insertable into the aligned openings to secure the pivot shafts 80 against lateral and rotational movement relative to the forward crossbar 66 and thereby lock the arms 70 in the inoperative position. The locking pins 86 are removable from the aligned openings to permit selective, independent rotation and simultaneous lateral sliding movement of the pivot shafts 80 within the forward crossbar 66. A plurality of linearly aligned holes 88 are provided in the pivot shafts 80 at spaced longitudinal locations therealong to be spaced 90° from the openings therein, and holes 90 are provided in the forward crossbar 66 laterally spaced from and horizontally aligned with the openings 82. The holes 88 are selectively alignable with the holes 90 when the arms 70 are rotated relative to the forward crossbar 66 forwardly or rearwardly of the frame 12 to an operative position 90° from the inoperative position for the bars 72 as shown in FIG. 2. A selective one of the holes 88 in the pivot shafts 80 is alignable with a hole 90 to extend the bars 72 laterally outwardly from the legs 16 a selected distance. The locking pins 86 can be inserted into the aligned holes 88 and 90 to lock the bars 72 in the forward or rearward rotational position at a selected lateral distance from the legs 16 of the frame 12. The bars 72 are also selectively rotatable 360° within the open-ended sockets 74 to permit the fingers 77 to be disposed in a plane containing the bars 72. A plurality of linearly aligned through holes 92 are provided in the bars 72 at spaced longitudinal locations therealong to be selectively aligned with holes 96 in the open-ended sockets 74, and the central longitudinal axes of the holes 96 are disposed transverse to and in longitudinal alignment with the central longitudinal axes of the closed-end sockets 78 and, therefore, the central longitudinal axes of the pivot shafts 80. Locking pins 98 are insertable into the aligned holes 92 and 96 to lock the bars 72 in a selected rotational position and a selected one of the holes 92 can be aligned with the holes 96 to adjust the longitudinal length of the arms 70 relative to the pivot shafts 80.

As shown in FIGS. 8 and 9, a second forward crossbar 100 has a pair of spaced, parallel plates 102 extending perpendicularly from a rearward surface thereof at opposing open ends to receive therebetween a respective leg 16 of the frame 12. Horizontally aligned holes 104 are provided in each pair of plates 102 for selective alignment with holes 106 provided through lateral sides of the legs 16 at spaced longitudinal locations therealong, and a locking pin 108 is insertable into the aligned holes 104 and 106 to secure the second forward crossbar 100 to the legs 16 parallel with the crossbar 66 at a selected longitudinal position between the crossbar 66 and the base 14. Opposing open ends of the second forward crossbar 100 extend laterally beyond the legs 16 and padded bushings 103 are mounted on the opposing open ends of the second forward crossbar 100 to selectively, slidably and rotatably receive the ends of the pivot shafts 80. Openings 110 are formed in the second forward crossbar 100 to be aligned with the openings (not shown) in the pivot shafts 80 when the arms 70 are disposed in the inoperative position generally parallel with the legs 16, and the locking pins 86 are insertable into the aligned openings to secure the arms 70 in such position. Holes 112 are provided in the second forward crossbar 100 laterally spaced from and horizontally aligned with the openings 110 for selective alignment with the holes 88 in the pivot shafts 80 when the arms 70 are independently rotated relative to the second forward crossbar 100 forwardly or rearwardly of the frame 12 to an operative position 90° from the inoperative position for the arms 70. The locking pins 86 can be inserted into the aligned holes 88 and 112 to lock the arms 70 in the forward or rearward rotational position at a selected distance laterally outwardly from the legs 16 of the frame 12.

Preferably, the base 14, the legs 16 and the handle 18 are made from 1" metal channel joined by welding and the wheels 20 are preferably 6" diameter grooved rubber wheels mounted on a ⅝" diameter axle extending through the base 14. The width of the frame 12 measured between outermost lateral sides of the legs 16 is approximately 14¼", and the height of the frame 12 measured from the bottom of the base 14 to the top of the handle 18 is approximately 46¾". The flanges 22 are preferably made from approximately ¼" thick metal welded to the base 14, and the flanges 22 extend forwardly of the base 14 approximately 5". The shoulder 26 preferably extends downwardly from the flanges 22 approximately 2", and the lateral width of the shoulder 26 is approximately 8½" or, in other words, approximately 70% the width of the base 14 measured between the legs 16. The foot 28 extends forwardly of the shoulder 26 approximately 1½", and the lateral width of the foot 28 is approximately 2½" or, in other words, approximately 20% the width of the base 14. The rearward crossbar 34 is preferably made from 1" square metal channel, and pivot shaft 32 is made from ¾" diameter metal pipe. The vertical and horizontal members 38 and 42 are also preferably made from 1" square metal channel, and the tubular member 40 is made from ¾" diameter pipe. The length of the vertical member 38 is approximately 22", the length of the tubular member 40 is approximately 12", and the holes 46 in the tubular member 40 are preferably spaced 1" apart. The forward crossbar 66 and the second forward crossbar 100 are preferably made from 1" square metal channel, and the pivot shafts 80 are made from ¾" diameter metal pipe sized to extend approximately 7" into the forward crossbars 66 and 100 from the bushings 68 and 103, respectively. The openings 84 in the pivot shafts 80 are preferably spaced approximately 1" apart. The bars 72 are preferably 1" diameter metal rod approximately 31" in length to the gripping fingers 77, and gripping fingers 77 are made from ¼" thick plate approximately 6" in length and 1½" in width. The holes 92 in the bars 72 are spaced approximately 1" apart.

As shown in FIGS. 5-8, in operation of the dolly in transporting a stacked washer/dryer unit, the frame 12 is grasped via the handle 18 and moved by an operator along the ground on the wheels 20 to a closet 119 containing a stacked washer/dryer unit 120 in a drip pan 122 on the bottom of the closet. With the closet door open, the flange 22 is placed up and over an upstanding peripheral side wall 124 of the drip pan to position the frame 12 in an upright position with the positioning shoulder 26 within the drip pan adjacent an inner surface of the peripheral side wall 124 and the foot 28 beneath the washer/dryer unit 120 adjacent a bottom wall 126 of the drip pan. The locking pins 86 are removed from the forward crossbar 66 to permit the pivot shafts 80 to be slid independently within the forward crossbar 66 to selectively adjust the arms 70 laterally outwardly of the legs 16 in accordance with the width of the washer/dryer unit and to permit the pivot shafts 80 to be rotated within the forward crossbar 66 to rotate the arms 70 forwardly of the legs 16. In other words, the arms 70 are rotatable around a first axis, defined by the pivot shafts 80, and are slidable along this first axis. The locking pins 98 are removed from the aligned holes 92 and 96 to permit the bars 72 to be rotated within the open-ended sockets 74 to position the gripping fingers 77 in a plane parallel with the legs 16 and containing the bars 72 to allow the arms 70 to be manually placed in the clearance between lateral sides of the washer/dryer unit 120 and the side walls of the closet 119 when the bars 72 are rotated within the forward crossbar 66. The bars 72 are rotated via the pivot shafts 80 forwardly of the legs 16 to a position generally perpendicular with the legs 16, and the bars 72 are slid within the open-ended sockets 74 to position the bars 72 closely adjacent the lateral sides of the washer/dryer unit 120 and adjacent a back surface of the washer/dryer unit. The bars 72 are then rotated within the open-ended sockets 74 to position the gripping fingers 77 to face inwardly toward a center of the washer/dryer unit and extend closely along the back surface of the washer/dryer unit. The arms 70, therefore, are rotatable around a second axis through the open-ended sockets 74, are slidable along the second axis, and the second axis is perpendicular to the first axis. Once the bars 72 are generally perpendicular with the legs 16, and extend closely along the lateral sides of the washer/dryer unit to tightly hold such unit therebetween, and the gripping fingers 77 tightly engage the back surface of the washer/dryer unit as shown in FIG. 5, the locking pins 86 are inserted into the aligned holes 88 and 90 and the locking pins 98 are inserted into the aligned holes 92 and 96. The handle 18 is then utilized to rotate the frame 12 around the wheels 20 and the washer/dryer unit 120 is lifted from the drip pan 122 while being stabilized and positioned by the arms 70 as the washer/dryer unit is tilted out of the closet to be supported against the forward crossbar 66 as shown in FIG. 6. The padding on the handle 18, the bushings 68, the gripping fingers 77, the positioning shoulder 26 and the foot 28 protects the hands of the operator as well as the load being transported and closet walls and other nearby objects. Once the washer/dryer unit 120 has been removed from the closet, the frame 12 may be moved via the wheels 20. The washer/dryer unit can be supported on the frame 12 in a selected inclined position by removing the locking pin 54 from the frame support 36, rotating the frame support 36 rearwardly relative to the frame 12 to align the first apertures 56 and 58, inserting the locking pin 54 into the aligned first apertures 56 and 58 to position the frame support 36 in the first operative position as shown in FIG. 6. Alternatively, the frame support 36 can be rotated to align the second apertures and the locking pin 54 can be inserted into the aligned second apertures to position the frame support 36 in the second operative position shown in FIG. 7. The angle of inclination for the frame 12 relative to the ground can be further adjusted by removing the locking pin 48 from the vertical member 38 and selectively slidably extending the tubular member 40 within the vertical member 38 to align a selective one of the holes 46 with the hole 44. When transporting loads relatively smaller in height than stacked washer/dryer units or the like, the second forward crossbar 100 can be secured to the legs 16 at a selected location therealong by inserting the locking pins 108 through the aligned holes 104 and 106 in the plates 102 and the legs 16, respectively, as depicted in FIG. 8. The locking pins 86 are then removed from the aligned holes 88 and 90, and the pivot shafts 80 are removed from the bushings 68 and inserted through the bushings 103 into the second forward crossbar 100. The locking pins 86 are then inserted into selective aligned holes 110 and 84 in the second forward crossbar 100 and the pivot shafts 80, respectively.

Having described preferred and alternative embodiments of a new and improved load transporting dolly, it is believed that other modifications, variations and changes will be suggested to those skilled in the art in view of the teachings set forth herein. It is therefore to be understood that all such variations, modifications and changes are believed to fall with the scope of the present invention as defined by the appended claims.

What is claimed is:

1. A vehicle for transporting a load along the ground comprising
   a frame having an upper end and a lower end;
   means on said lower end for carrying a load upon said frame;
   wheel means on said lower end for moving said frame along the ground and for permitting said frame to be rotated around said wheel means between an upright position and an inclined position;
   means mounted on said frame for positioning a load carried on said lower end adjacent said frame, said positioning means including a pair of parallel arms having longitudinal axes and mounted on said frame to be independently, selectively rotatable relative to said frame around said longitudinal axes and around an axis transverse to said arms; and
   means mounted on saidframe to be rotated independently of said frame, said positioning means, said wheel means and saidcarrying means for selectively supporting sid frame in an inclined position relative to the ground.

2. A vehicle for transporting a load as recited in claim 1 wherein saidload carrying means includes horizontally oriented foot means joined to saidlower end of saidframe for carrying a load.

3. A vehicle for transporting a load as recited in claim 2 wherein saidwheel means include a pair of wheels and saidfoot means is disposed between saidwheels.

4. A vehicle for transporting a load as recited in claim 3 wherein saidarms are disposed between saidupper and lower ends and saidtransverse axis is parallel with saidfoot means.

5. A vehicle for transporting a load as recited in claim 4 further including means for independently, rotatably mounting saidarms on saidframe to permit sid arms to be selectively rotated between a first position parallel with saidframe and a second position parallel with said foot means.

6. A vehicle for transporting a load as recited in claim 5 further including means for securing saidsupporting means in a selective angular position relative to saidframe.

7. A vehicle for transporting a load as recited in claim 6 wherein saidsupporting means includes a base for engaging the ground when saidsupporting means is secured in a selective angular position relative to saidframe.

8. A vehicle for transporting a load as recited in claim 7 further including means for rotatably mounting sid supporting means on saidframe and wherein saidsupporting means includes means joined to saidsupporting means mounting means and saidbase for positioning saidbase a selected distance from saidsupporting means mounting means.

9. A vehicle for transporting a load as recited in claim 8 further including means for selectively adjusting sid distance of saidbase from saidsupporting means mounting means.

10. A dolly for carrying a load comprising
a frame including a pair of upstanding, parallel sides having lower ends and upper ends;
pivot means on saidlower ends for permitting saidframe to be rotated between an upright position and an inclined position;
means on saidlower ends for engaging a load; and
a pair of parallel arms mounted on saidframe laterally outwardly of saidsides and between saidupper and lower ends for selective positioning around a load engaged by saidengaging means, saidarms including longitudinal axes and being selectively rotatable relative to sid sides around sid longitudinal axes and around an axis transverse to saidsides, each of saidarms being independently, laterally movable relative to saidsides to position saidarms at selective, laterally spaced, parallel positions.

11. A dolly as recited in claim 10 wherein said engaging means is disposed between saidlateral sides to extend forwardly of saidframe.

12. A dolly as recited in claim 11 further including mounting means having socket means for mounting saidarms laterally outwardly of saidsides to permit saidarms to be selectively, independently rotated forwardly and rearwardly of saidframe.

13. A dolly as recited in claim 12 wherein sid mounting means further includes means for permitting saidarms to be selectively moved laterally relative to saidopposing sides along said transverse axis.

14. A dolly as recited in claim 13 further including means on saidarms spaced from saidmounting means for gripping a load engaged by saidload engaging means.

15. A dolly as recited in claim 14 further including means for selectively spacing saidgripping means from saidmounting means.

16. A dolly as recited in claim 15 further including means for selectively portioning saidmounting means on saidframe between saidupper ends and saidlower ends.

17. A dolly for transporting a load having a pair of lateral sides, a front side and a rear side, the load being contained in a tray having an upstanding side wall with an upper edge comprising
a dolly having a frame for transporting the load and including a lower end to be positioned perpendicularly over the upper edge of the side wall and an upper end;
foot means on saidlower end for engaging the load within the tray;
foot positioning means disposed between saidfoot means and saidlower end to extend downwardly within the tray adjacent the side wall for positioning saidfoot means within the tray to engage the load when saidlower end is positioned over the upper edge of the side wall with saidframe extending along the front side of the load;
a pair of parallel arms having longitudinal axes and mounted on saidframe to be rotated relative to saidframe around an axis transverse to saidarms to position said arms outwardly from the frame and along the lateral sides of the load; and
gripping fingers angularly joined to saidarms, saidarms being rotatable around saidlongitudinal axes to move saidgripping fingers between a position wherein saidgripping fingers and sid arms extend along the lateral sides of the load in parallel planes containing saidarms and a position wherein saidgripping fingers extend along the rear side of the load in a plane angularly disposed with saidparallel planes.

18. A dolly as recited in claim 17 further including mans for selectively rotating saidframe around saidlower end between an upright position wherein saidfoot means can be positioned to engage the load within the tray and an inclined position wherein saidfoot means can be tilted to position the front side of the load against saidframe.

19. A dolly as recited in claim 18 wherein saidmeans for rotating includes handle means on saidupper end for rotating sid frame around saidlower end.

20. A dolly as recited in claim 19 further including means on saidlower end for being positioned over the side wall of the tray and wherein saidfoot positioning means is joined to said means on saidlower end to position saidfoot means in spaced parallel relation with saidmeans on saidlower end.

* * * * *